US009648844B2

(12) United States Patent
Jeong et al.

(10) Patent No.: US 9,648,844 B2
(45) Date of Patent: May 16, 2017

(54) CURD MAKER AND REFRIGERATOR HAVING THE SAME

(71) Applicant: Samsung Electronics Co., Ltd., Suwon-si (KR)

(72) Inventors: Jin Jeong, Yongin-si (KR); Bong Su Son, Cheonan-si (KR); Do Yun Jang, Busan (KR); Jeong Min Jeon, Busan (KR); Yeon Woo Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 14/535,637

(22) Filed: Nov. 7, 2014

(65) Prior Publication Data
US 2015/0143832 A1    May 28, 2015

(30) Foreign Application Priority Data
Nov. 27, 2013  (KR) .................. 10-2013-0145019

(51) Int. Cl.
*A01J 25/12* (2006.01)
*A01J 25/16* (2006.01)

(52) U.S. Cl.
CPC ............. *A01J 25/12* (2013.01); *A01J 25/165* (2013.01)

(58) Field of Classification Search
CPC ..... A01J 25/12; A01J 25/165; F25D 2400/02; F25D 2700/16
USPC ............... 62/135; 99/452, 455, 467, 468
See application file for complete search history.

(56) References Cited

U.S. PATENT DOCUMENTS

| | | | | | |
|---|---|---|---|---|---|
| 4,802,407 | A | * | 2/1989 | Negri | A01J 25/001 366/145 |
| 5,327,818 | A | * | 7/1994 | Olivetti | A23C 9/1223 366/144 |
| 6,213,007 | B1 | * | 4/2001 | Lande | A23G 9/12 366/146 |
| 6,571,690 | B1 | * | 6/2003 | Hsu | A23C 9/1226 219/430 |

* cited by examiner

*Primary Examiner* — Marc Norman
(74) *Attorney, Agent, or Firm* — Staas & Halsey LLP

(57) ABSTRACT

A refrigerator having a curd maker to make curd directly disposed in a refrigerating compartment wherein curd is made by the curd maker disposed in the refrigerating compartment and is kept fresh. The refrigerator includes a curd maker provided in a refrigerating compartment to ferment milk into curd, wherein the curd maker includes a case including an outer case forming an external appearance of the case and an inner case provided in the outer case, an insulation member provided between the outer case and the inner case, a curd container received in the inner case to store milk, a heater provided between the inner case and the insulation member to heat the curd container, a fan to supply cool air from the refrigerating compartment to the curd container to cool the curd container, and a temperature sensor to measure temperature in the curd maker.

46 Claims, 14 Drawing Sheets

CURD MAKER AND REFRIGERATOR HAVING THE SAME

CROSS-REFERENCE TO RELATED APPLICATIONS

This application claims the priority benefit of Korean Patent Application No. 10-2013-0145019, filed on Nov. 27, 2013 in the Korean Intellectual Property Office, the disclosure of which is incorporated herein by reference.

BACKGROUND

1. Field

Embodiments relate to a curd maker and a refrigerator having the same.

2. Description of the Related Art

Generally, a refrigerator is an apparatus having a storage compartment and a cool air supply device to supply cool air to the storage compartment to keep food fresh.

Temperature of the storage compartment is maintained within a predetermined temperature range required to keep food fresh.

The storage compartment of the refrigerator is configured such that the front of the storage compartment is open and the open front of the storage compartment is normally closed by a door to uniformly maintain temperature of the storage compartment.

The storage compartment is partitioned into a refrigerating compartment and a freezing compartment by a partition. The refrigerating compartment and the freezing compartment are opened and closed by a refrigerating compartment door and a freezing compartment door, respectively.

A curd maker is a device that ferments milk into curd. A container containing milk is heated such that the milk is fermented into curd.

The curd maker is independently provided. In addition, the curd maker only has a function to ferment milk into curd. For this reason, after curd is made by the curd maker, the curd is manually stored in the refrigerator.

The curd maker may be disposed in the refrigerating compartment such that curd is made by the curd maker and is stored using cool air in the refrigerating compartment.

SUMMARY

In an aspect of one or more embodiments, there is provided a refrigerator having a curd maker to make curd directly disposed in a refrigerating compartment wherein curd is made by the curd maker disposed in the refrigerating compartment and is kept fresh.

In an aspect of one or more embodiments, there is provided a refrigerator which includes a main body, a refrigerating compartment provided in the main body such that a front of the refrigerating compartment is open, and a curd maker provided in the refrigerating compartment to ferment milk into curd, wherein the curd maker includes a case including an outer case forming an external appearance of the case and an inner case provided in the outer case, an insulation member provided between the outer case and the inner case, a curd container received in the inner case to store milk, a heater provided between the inner case and the insulation member to heat the curd container, a fan to supply cool air from the refrigerating compartment to the curd container to cool the curd container, and a temperature sensor to measure temperature in the curd maker.

The case has a front which may be provided with openings, through which the curd container is inserted and withdrawn from the case, and the openings may include a first opening provided at a front of the outer case and a second opening provided at a front of the inner case.

The second opening may be opened and closed by a curd door and the curd container may be detachably mounted at a rear of the curd door.

The curd door may be moved forward and backward in a sliding fashion such that the curd container is inserted into and withdrawn from the curd maker.

The curd container may be open at a top of the curd container and a cover may be provided at the open top of the curd container to seal an interior of the curd container.

The second opening may be opened and closed by a curd door hinged to the inner case such that the curd container is inserted and withdrawn from the case, the curd container may be open at a top thereof, and a cover may be provided at the open top of the curd container to seal an interior of the curd container.

The outer case may be provided at a lower end of a rear of the outer case thereof with a first suction port, in which the fan is mounted and through which cool air from the refrigerating compartment is suctioned by the fan, and the insulation member and the inner case may be respectively provided with a second suction port and a third suction port corresponding in position to the first suction port such that the cool air suctioned by the fan is transferred to the curd container.

The curd container may be provided at a front, rear, and left and right sides of the curd container with a flow channel communicating with the third suction port while surrounding the curd container such that the cool air suctioned by the fan is transferred to the curd container.

The flow channel may include a first flow channel, communicating with the third suction port, surrounding lower part of the left and right sides and the front of the curd container, a second flow channel, divided from the first flow channel, surrounding upper part of the left and right sides and the front of the curd container, a third flow channel, via which the first flow channel and the second flow channel communicate with each other such that cool air having passed through the first flow channel is guided to the second flow channel, and a fourth flow channel communicating with the second flow channel to guide the cool air such that the cool air is discharged outside.

The first flow channel and the second flow channel may be divided from each other by division ribs provided at the left and right sides of the inner case and a rear of the curd door such that the first flow channel and the second flow channel are respectively located at the upper part and the lower part of the curd container to uniformly circulate the cool air along the upper part and the lower part of the curd container.

The third flow channel may be provided at a rear of the inner case and the first flow channel and the second flow channel may communicate with each other via the third flow channel such that the cool air having circulated along the first flow channel is guided to the second flow channel and circulates along the second flow channel.

The inner case may be provided at the rear thereof with a first discharge port communicating with the second flow channel such that the cool air having circulated along the second flow channel is discharged from the inner case.

The insulation member may be provided at a lower end of a rear thereof with a second discharge port, through which the cool air discharged through the first discharge port is discharged outside.

The insulation member may be provided with the fourth flow channel, via which the first discharge port and the second discharge port communicate with each other such that the cool air discharged through the first discharge port is discharged outside through the second discharge port.

The outer case may be provided with a third discharge port corresponding in position to the second discharge port such that the cool air discharged through the second discharge port is discharged outside.

When the curd container is heated by the heater to make curd, cool air suctioned by the fan may circulate along the flow channel to uniformly cool the curd container such that the curd is prevented from being fermented and kept fresh.

A partition, by which the curd maker is spaced apart from an inner liner defining the refrigerating compartment, may be coupled to the rear of the outer case.

The partition may include a blocking wall provided between the third discharge port and the first suction port to prevent the cool air discharged through the third discharge port from being re-suctioned through the first suction port.

The partition may be provided with a plurality of air vents, through which cool air from the refrigerating compartment is suctioned through the first suction port or the cool air suctioned through the first suction port circulates along the flow channel, is discharged through the third discharge port, and is transferred to the refrigerating compartment.

The insulation member may be provided at left and right sides and a bottom thereof with a heater installation part, in which the heater is installed.

The heater may heat the curd container at the left and right sides and a bottom of the curd container and the first flow channel and the second flow channel may be provided at the left and right sides of the curd container such that the upper and lower parts of the curd container are heated in a divided state and thus the curd container is uniformly heated.

The insulation member may be provided at an inner top thereof with a temperature sensor installation part, in which the temperature sensor is installed, and, based on the temperature in the curd maker measured by the temperature sensor, the heater may be controlled when the curd container is heated by the heater and the fan may be controlled when the curd container is cooled by the fan to control heating and cooling of the curd container.

In an aspect of one or more embodiments, there is provided a refrigerator which includes a curd maker provided in a refrigerating compartment to ferment milk into curd, wherein the curd maker includes a case including an outer case forming an external appearance of the case and an inner case provided in the outer case, an insulation member provided between the outer case and the inner case, a curd container received in the inner case to store milk, a heater provided at left and right sides and a bottom of the inner case to heat the curd container, a fan provided at a lower end of a rear of the outer case to supply cool air from the refrigerating compartment to the curd container, and a flow channel surrounding a front, rear, and left and right sides of the curd container such that the cool air supplied by the fan is transferred to the curd container, and wherein the flow channel includes a first flow channel and a second flow channel respectively provided at an upper part and a lower part of the left and right sides of the curd container in a divided state, the first flow channel and the second flow channel communicating with each other such that the cool air is uniformly transferred to the curd container.

The case has a front which may be provided with openings, through which the curd container is inserted and withdrawn from the case, and the openings may include a first opening provided at a front of the outer case and a second opening provided at a front of the inner case.

The second opening may be opened and closed by a curd door moving forward and backward in a sliding fashion and the curd container may be detachably mounted at a rear of the curd door such that the curd container is moved forward and backward in a sliding fashion together with the curd door and thus the curd container is inserted into and withdrawn from the curd maker.

The curd container maybe open at a top of the curd container and a cover may be provided at the open top of the curd container to seal an interior of the curd container.

The outer case may be provided at a lower end of a rear of the outer case with a first suction port, in which the fan is mounted and through which cool air from the refrigerating compartment is suctioned by the fan, and the insulation member and the inner case may be respectively provided with a second suction port and a third suction port corresponding in position to the first suction port such that the cool air suctioned by the fan is transferred to the curd container.

The flow channel may communicate with the third suction port such that the cool air suctioned by the fan is transferred to the curd container.

The flow channel may include a first flow channel, communicating with the third suction port, surrounding lower part of the left and right sides and the front of the curd container, a second flow channel, divided from the first flow channel, surrounding upper part of the left and right sides and the front of the curd container, a third flow channel, via which the first flow channel and the second flow channel communicate with each other such that cool air having passed through the first flow channel is guided to the second flow channel, and a fourth flow channel communicating with the second flow channel to guide the cool air such that the cool air is discharged outside.

The first flow channel and the second flow channel may be divided from each other by division ribs provided at the left and right sides of the inner case and a rear of the curd door such that the first flow channel and the second flow channel are respectively located at the upper part and the lower part of the curd container to uniformly circulate the cool air along the upper part and the lower part of the curd container.

The third flow channel may be provided at a rear of the inner case and the first flow channel and the second flow channel may communicate with each other via the third flow channel such that the cool air having circulated along the first flow channel is guided to the second flow channel and circulates along the second flow channel.

The inner case may be provided at the rear of the inner case with a first discharge port communicating with the second flow channel such that the cool air having circulated along the second flow channel is discharged from the inner case.

The insulation member may be provided at a lower end of a rear of the case between the inner case and the outer case with a second discharge port, through which the cool air discharged through the first discharge port is discharged outside.

The insulation member may be provided with the fourth flow channel, via which the first discharge port and the second discharge port communicate with each other such that the cool air discharged through the first discharge port is discharged outside through the second discharge port.

The outer case may be provided with a third discharge port corresponding in position to the second discharge port such that the cool air discharged through the second discharge port is discharged outside.

When the curd container is heated by the heater to make curd, cool air suctioned by the fan may circulate along the flow channel to uniformly cool the curd container such that the curd is prevented from being fermented and kept fresh.

A partition, by which the curd maker is spaced apart from an inner liner defining the refrigerating compartment, may be coupled to the rear of the outer case and the partition may include a blocking wall provided between the third discharge port and the first suction port to prevent the cool air discharged through the third discharge port from being re-suctioned through the first suction port.

The partition may be provided with a plurality of air vents, through which cool air from the refrigerating compartment is suctioned through the first suction port or the cool air suctioned through the first suction port circulates along the flow channel, is discharged through the third discharge port, and is transferred to the refrigerating compartment.

The heater may be installed at a heater installation part provided at left and right sides and a bottom of the insulation member to heat the curd container and the first flow channel and the second flow channel may be provided at the left and right sides of the curd container heated by the heater such that the upper and lower parts of the curd container are heated in a divided state and thus the curd container is uniformly heated.

The insulation member may be provided at an inner top of the case between the inner case and the outer case with a temperature sensor installation part, in which a temperature sensor to measure temperature in the curd maker is installed, and, based on the temperature in the curd maker measured by the temperature sensor, the heater may be controlled when the curd container is heated by the heater and the fan may be controlled when the curd container is cooled by the fan to control heating and cooling of the curd container.

In an aspect of one or more embodiments, there is provided a curd maker provided in a refrigerating compartment to make and store curd through heating and cooling includes a case including an outer case forming an external appearance of the case and an inner case provided in the outer case, an insulation member provided between the outer case and the inner case, a curd container received in the inner case to store milk, a heater provided at left and right sides and a bottom of the inner case to heat the curd container, a fan provided at a lower end of a rear of the outer case to supply cool air from the refrigerating compartment to the curd container, a temperature sensor provided at a top of the inner case to measure temperature, and a flow channel surrounding a front, rear, and left and right sides of the curd container such that the cool air supplied by the fan is transferred to the curd container, wherein the flow channel includes a first flow channel, along which cool air suctioned by the fan circulates around lower parts of the left and right sides and the front of the curd container, a second flow channel, divided from the first flow channel by division ribs provided at the left and right sides of the inner case and a rear of a curd door, along which the cool air having circulated along the first flow channel circulates around upper parts of the left and right sides and the front of the curd container, a third flow channel, via which the first flow channel and the second flow channel communicate with each other, and a fourth flow channel communicating with the second flow channel such that the cool air having circulated along the second flow channel is discharged outside.

In an aspect of one or more embodiments, there is provided a refrigerator includes a main body, a refrigerating compartment provided in the main body such that a front of the refrigerating compartment is open, and a curd maker provided in the refrigerating compartment to ferment milk into curd, wherein the curd maker includes a curd container to store milk, a heater to heat the curd container to ferment the milk, a fan to supply cool air from the refrigerating compartment to the curd container to cool the curd container, a temperature sensor to measure temperature in the curd maker, and a controller to control operation of the curd maker, and wherein the controller controls the heater to be turned on to heat the curd container, when fermentation of the milk is completed, the controller controls the heater to be turned off and simultaneously controls the fan to be turned on to cool the curd container, and, when cooling of the milk is completed, the controller controls the fan to be turned off and then controls the fan to be repeatedly turned fan on/off such that curd made by fermenting the milk is stored in a refrigerated state.

The controller may include a fermentation button to heat the curd container such that the milk is fermented, a cooling button to cool the fermented milk, and a storage button to store the cooled milk in a refrigerated state.

When the fermentation button is operated, the heater may be turned on to heat the curd container, the heater may be controlled to be repeatedly turned on/off such that the curd container is heated to a temperature of 30 degrees or more for less than 6 hours to ferment the milk, when the milk is fermented into curd, the heater may be controlled to be turned off and simultaneously the fan may be controlled to be turned on such that the curd container is cooled to a temperature of minus 5 degrees or less for less than 6 hours, and, when cooling is completed, the fan may be controlled to be turned off and then to be repeatedly turned on/off such that the curd is stored in a refrigerated state.

When the cooling button is operated, the fan may be controlled to be turned on such that the curd container is cooled to a temperature of minus 5 degrees or less for less than 6 hours, and, when cooling is completed, the fan may be controlled to be turned off and then to be repeatedly turned on/off such that the curd is stored in a refrigerated state.

When the storage button is operated, the fan may be controlled to be repeatedly turned on/off such that the curd is stored in a refrigerated state.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
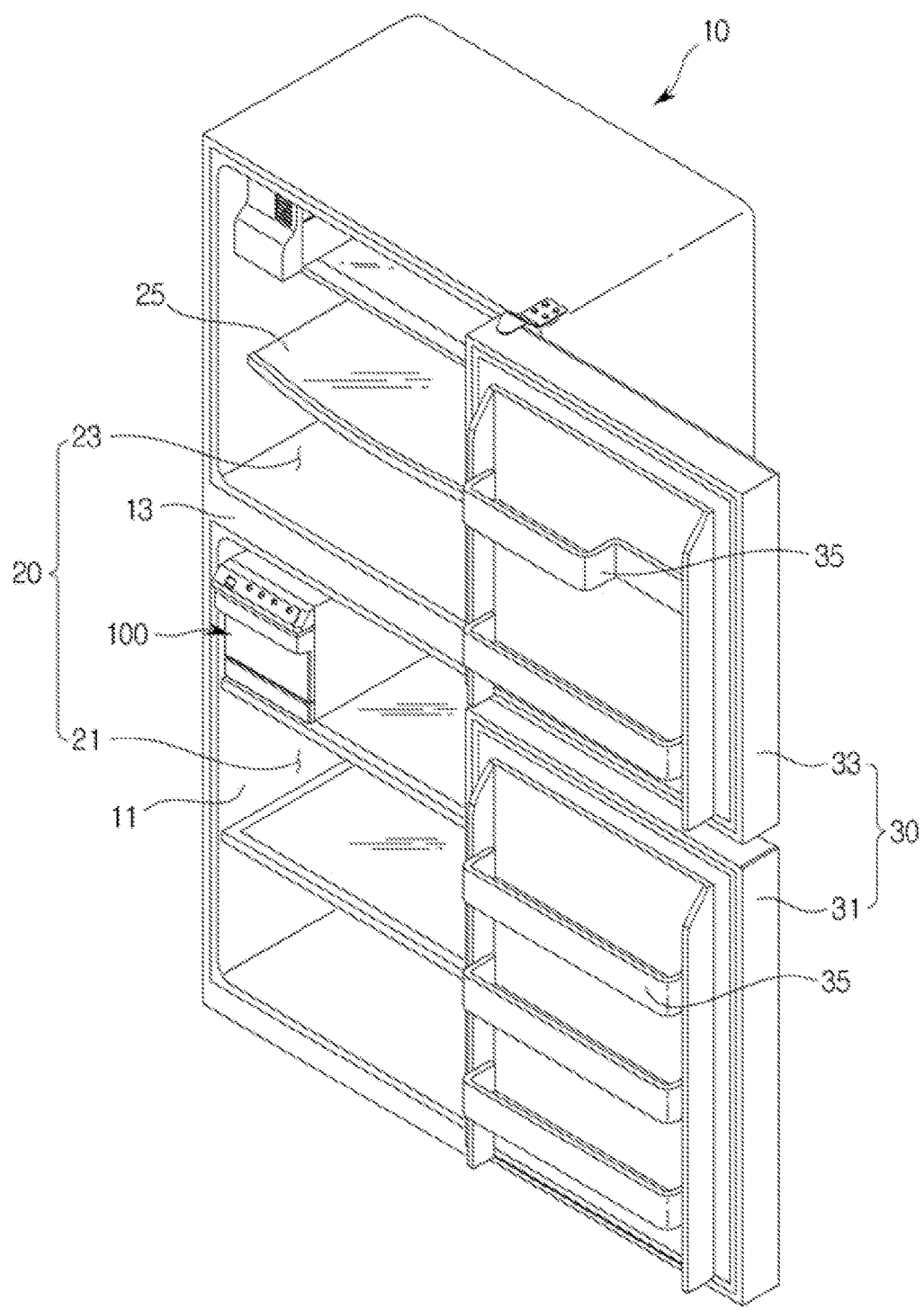
FIG. 1 is a perspective view of a refrigerator, in a refrigerating compartment of which a curd maker according to an embodiment is disposed.

Reference will now be made in detail to embodiments, examples of which are illustrated in the accompanying drawings, wherein like reference numerals refer to like elements throughout.

As shown in FIG. 1, a refrigerator includes a main body 10, a storage compartment 20 provided in the main body 10 such that the front of the storage compartment 20 is open, and a door 30 hinged to the main body 10 to open and close the open front of the storage compartment 20.

The main body 10 includes an inner liner 11 defining the storage compartment 20, an outer liner (not shown) forming the external appearance thereof, and a cool air supply device (not shown) to supply cool air into the storage compartment 20.

The cool air supply device may include a compressor, a condenser, an expansion valve, an evaporator, a fan, and a cool air duct. Between the inner liner 11 and the outer liner of the main body 10 is foamed an insulation member (not shown) to prevent leakage of cool air from the storage compartment 20.

The storage compartment 20 is partitioned into a refrigerating compartment 21 and a freezing compartment 23 by a partition 13. A plurality of shelves 25 may be provided in the refrigerating compartment 21 and/or the freezing compartment 23 to partition the refrigerating compartment 21 and/or the freezing compartment 23 into a plurality of spaces.

The refrigerating compartment 21 and the freezing compartment 23 are opened and closed by a refrigerating compartment door 31 and a freezing compartment door 33 hinged to the main body 10, respectively. A plurality of door guards 35 to receive food, etc. may be mounted at the rear of the door 30.

A curd maker 100 to ferment milk into curd may be provided in the refrigerating compartment 21.

Although the curd maker 100 is shown as being disposed in the refrigerating compartment 21 in the drawing, an additional independent space may be provided in the refrigerating compartment 21 such that the curd maker 100 is disposed in the additional independent space.

Figure 2:
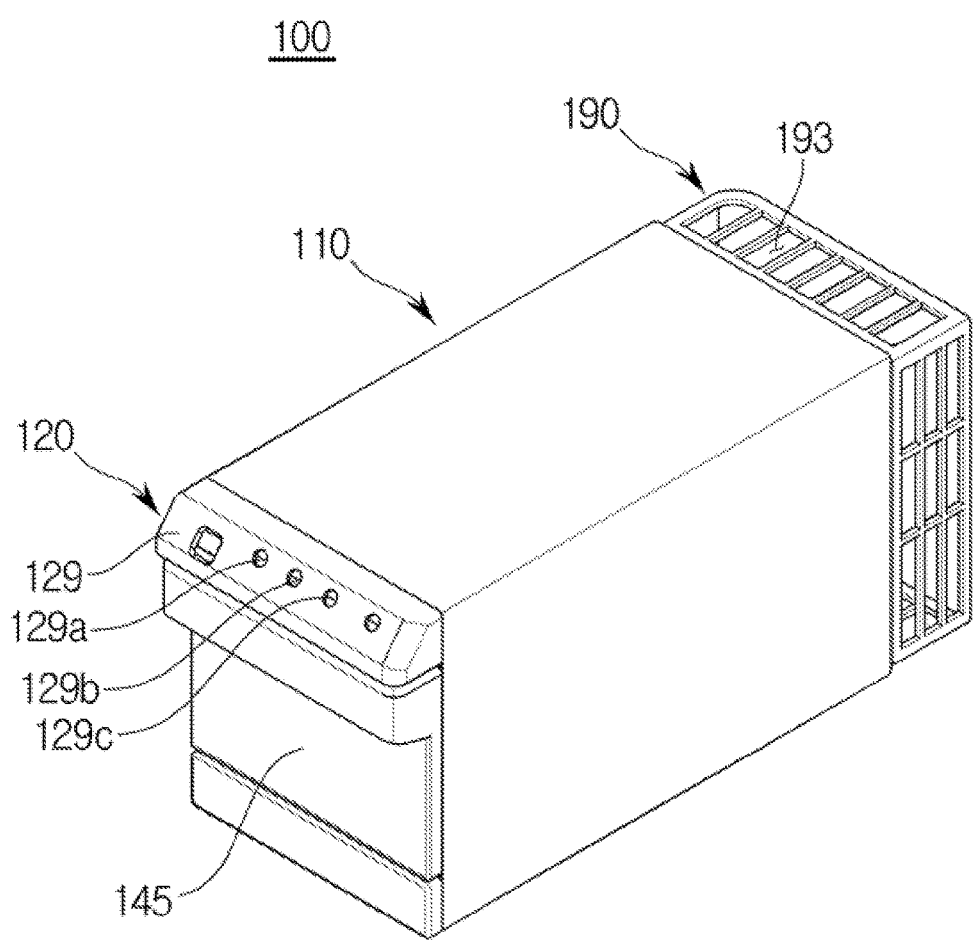
FIG. 2 is a perspective view of the curd maker according to an embodiment.
Figure 3:
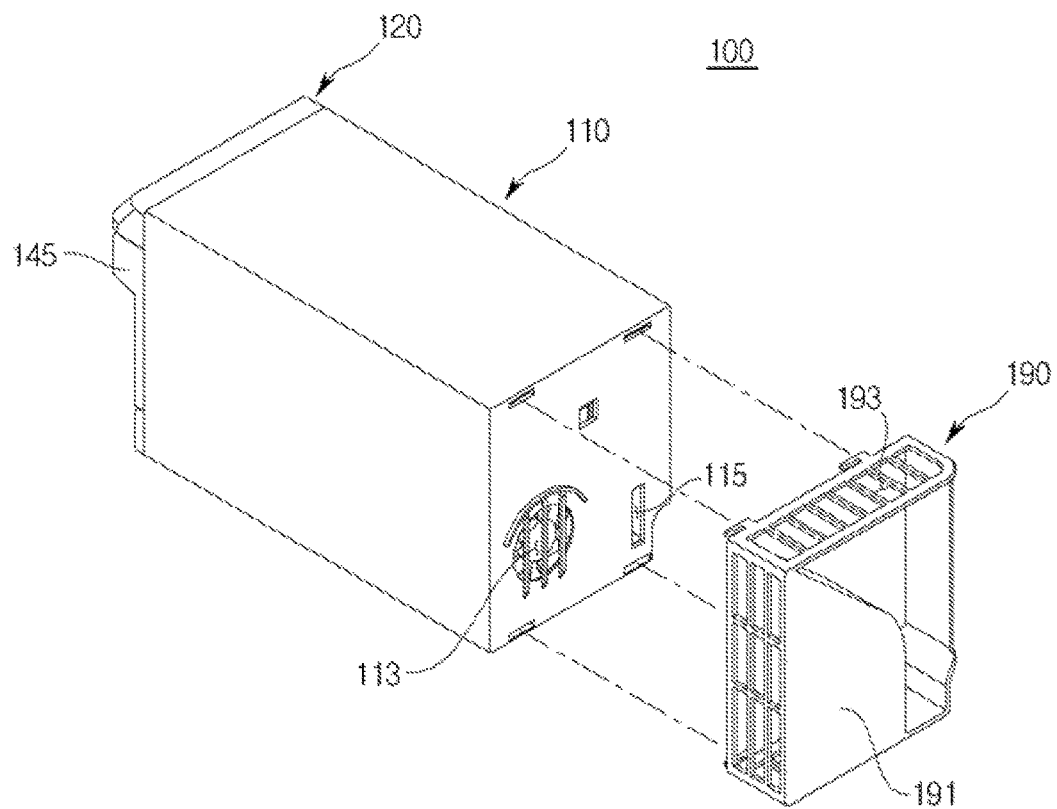
FIG. 3 is a view showing a state in which a partition is coupled to an outer case of the curd maker according to an embodiment.
Figure 4:
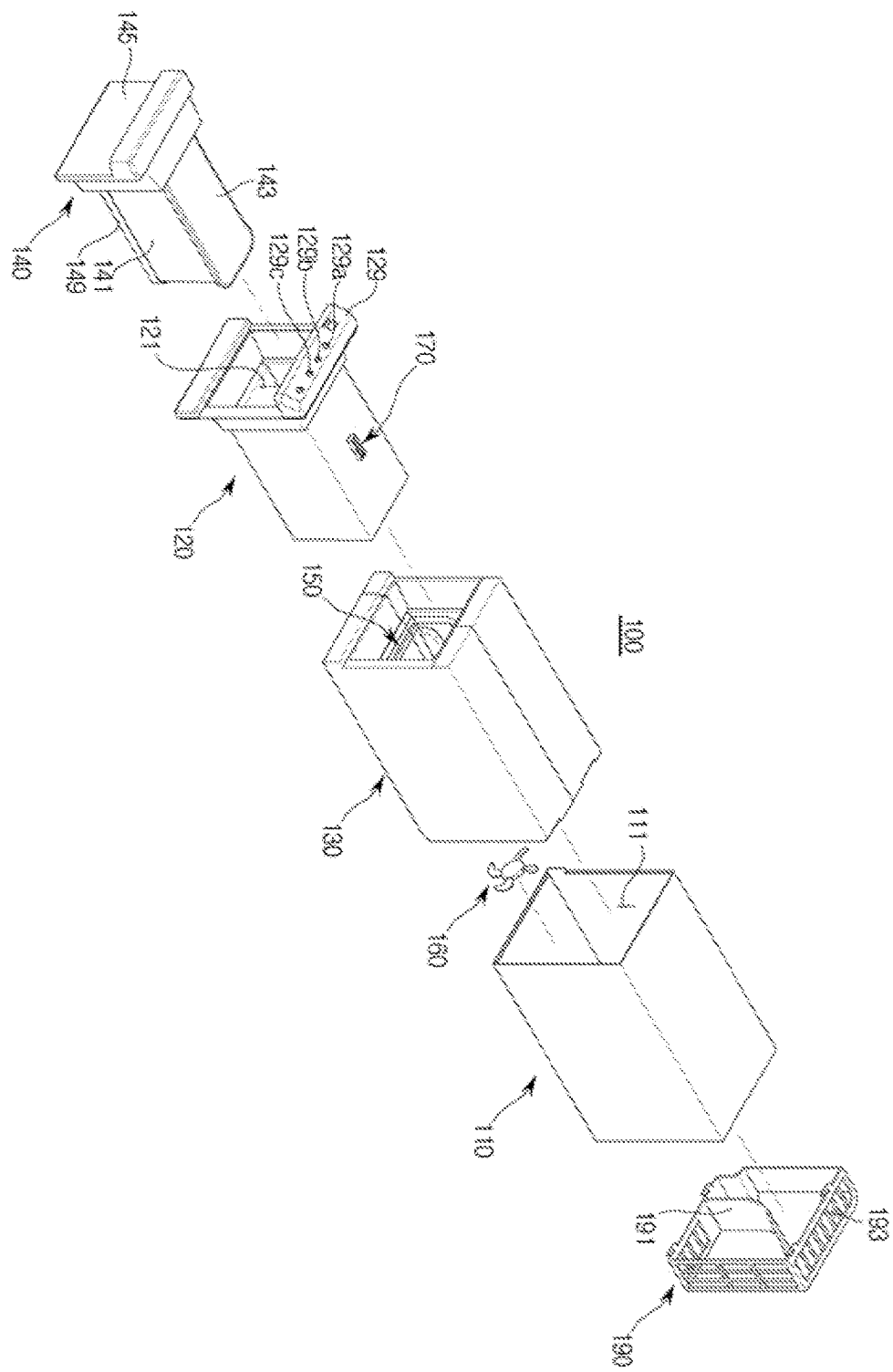
FIG. 4 is an exploded perspective view of the curd maker according to an embodiment.

As shown in FIGS. 2 to 4, the curd maker 100 includes an case 110 and 120 including an outer case 110 forming the external appearance thereof and an inner case 120 provided in the outer case 110, an insulation member 130 provided between the outer case 110 and the inner case 120, a curd container assembly 140 including a curd container 141 received in the inner case 120 to store milk, a heater 150 to heat the curd container 141 to ferment the milk stored in the curd container 141, a fan 160 to supply cool air to the curd container 141 to store the fermented milk in a refrigerated state, and a temperature sensor 170 to measure temperature in the curd maker 100.

The outer case 110 forms the external appearance of the curd maker 100. The outer case 110 and the inner case 120 are respectively provided at fronts thereof with openings 111 and 121, through which the curd container 141 is inserted into and withdrawn from the curd maker 100.

The openings 111 and 121 include a first opening 111 provided at the front of the outer case 110 and a second opening 121 provided at the front of the inner case 120.

A partition 190, by which the curd maker 100 is spaced apart from the inner liner 11, is coupled to the rear of the outer case 110.

The partition 190 is provided with a plurality of air vents 193, through which cool air from the refrigerating compartment 21 is suctioned into the curd maker 110 through suction ports 113, 123, and 131 of the curd maker 110, which will hereinafter be described, and the suctioned air is discharged into the refrigerating compartment 21 through discharge ports 115, 125, and 133 of the curd maker 110, and a blocking wall 191 to prevent cool air discharged through the discharge ports 115, 125, and 133 from being re-suctioned through the suction ports 113, 123, and 131, thereby preventing recirculation of the cool air.

The outer case 110 is provided at the rear thereof with a first suction port 113, in which the fan 160 to suction cool air from the refrigerating compartment 21 and a third discharge port 115, through which cool air suctioned into the curd maker 100 is discharged.

A portion of the inner case 120 is inserted into the outer case 110. The inner case 120 is provided at the rear thereof with a third suction port 123 corresponding in position to the first suction port 113 of the outer case 110 and a first discharge port 125, through which cool air suctioned into the curd maker 100 is discharged.

The inner case 120 is provided at the left and right sides thereof with division ribs 127 to vertically divide a flow channel 180, which will hereinafter be described, into a first flow channel 181 and a second flow channel 183.

Since the flow channel 180 is provided to surround the curd container 141, a division rib 147 is also provided at the rear of a curd door 145 in addition to the left and right sides of the inner case 120.

The division rib 147 provided at the rear of the curd door 145 is connected to the division ribs 127 provided at the left and right sides of the inner case 120 to vertically divide the flow channel 180 into the first flow channel 181 and the second flow channel 183 together with the division ribs 127 provided at the left and right sides of the inner case 120.

A controller 129 to control the heater 150 and the fan 160 according to temperature measured by the temperature sensor 170 may be provided at the upper part of the second opening 121 provided at the front of the inner case 120.

The insulation member 130 is provided between the outer case 110 and the inner case 120.

The insulation member 130 is provided at the rear thereof with a second suction port 131 corresponding in position to the first suction port 113 provided at the rear of the outer case 110 such that cool air suctioned through the first suction port 113 of the outer case 110 is supplied into the curd maker 100 through the second suction port 131 of the insulation member 130 and the third suction port 123 of the inner case 120.

The insulation member 130 is provided at the rear thereof with a second discharge port 133, through which cool air suctioned into the curd maker 100 is discharged, in addition to the second suction port 131.

The second discharge port 133 positionally corresponds to the third discharge port 115 of the outer case 110. The second discharge port 133 communicates with the first discharge port 125 of the inner case 120 via a fourth flow channel 187, which will hereinafter be described, such that cool air suctioned into the curd maker 100 is discharged through the first discharge port 125 of the inner case 120, the second discharge port 133 of the insulation member 130, and the third discharge port 115 of the outer case 110.

The insulation member 130 is provided at the inner left and right sides and bottom thereof with a heater installation part 135, in which the heater 150 to heat the curd container 141 is installed. The insulation member 130 is provided at the inner top thereof with a temperature sensor installation part 137, in which the temperature sensor 170 to measure temperature in the curd maker 100 is installed.

Figure 5:
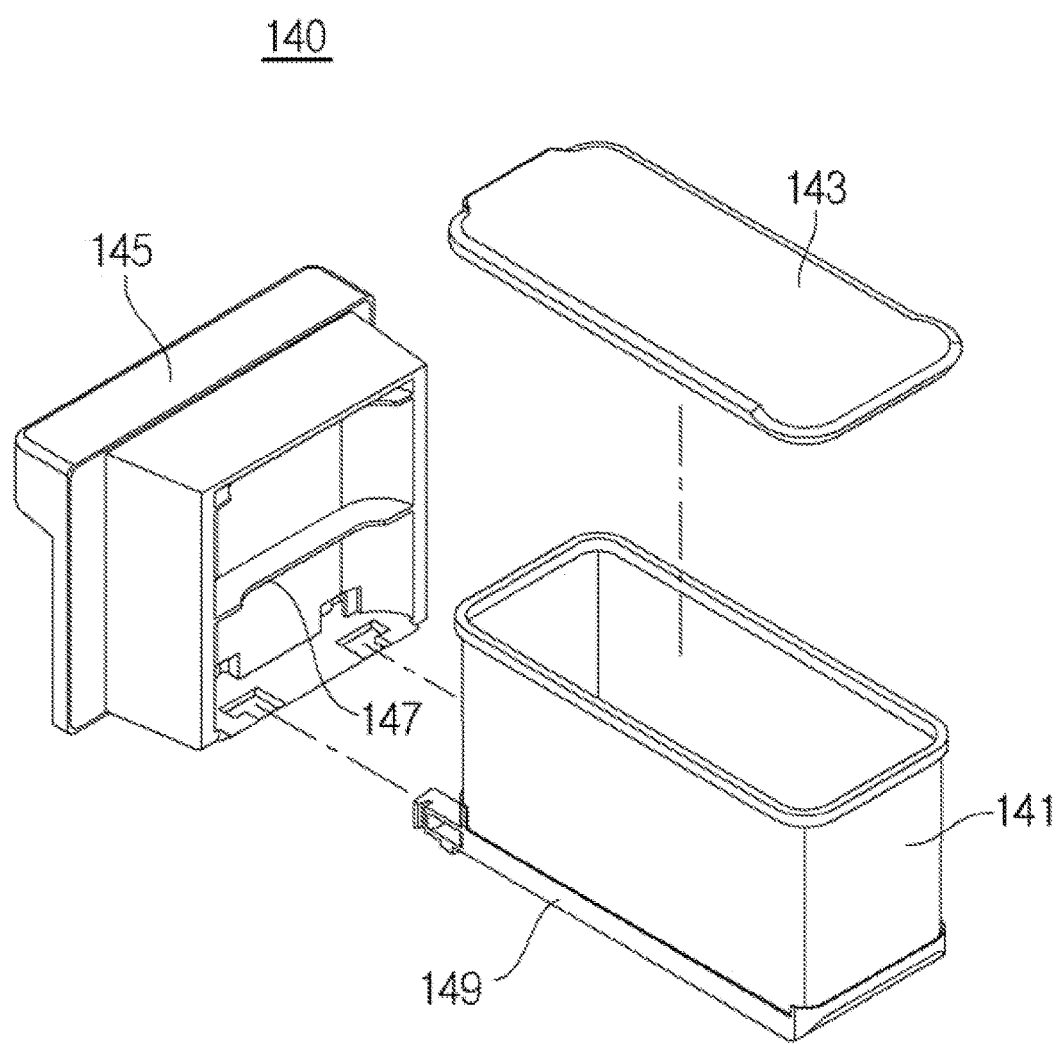
FIG. 5 is an exploded perspective view of a curd container assembly according to an embodiment.
Figure 6:
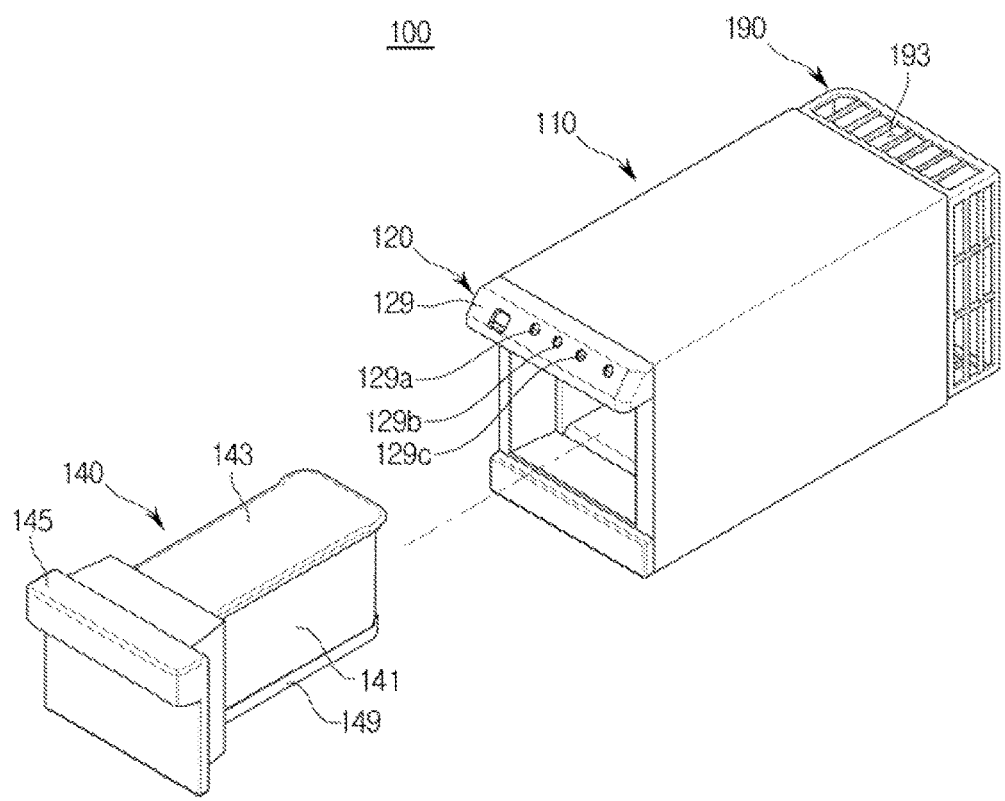
FIG. 6 is a view showing a state in which the curd container assembly according to embodiment withdrawn.

As shown in FIGS. 4 to 6, the curd container assembly 140 includes a curd container 141 to store milk, the curd container 141 being inserted into the inner case 120, a cover 143 to cover the open top of the curd container 141, a curd door 145 to open and close the second opening 121 provided at the front of the inner case 120, a division rib 147 provided at the rear of the curd door 145 to vertically divide the flow channel 180 into the first flow channel 181 and the second flow channel 183 together with the division ribs 127 provided at the left and right sides of the inner case 120, and a curd container mounting part 149, coupled to the curd door 145, in which the curd container 141 is detachably mounted.

The top of the curd container 141 is open. The curd container 141 stores milk used to make curd. The curd container 141 is inserted into the curd maker 100. The cover 143 is provided at the open top of the curd container 141 to cover the curd container 141, thereby preventing overflowing of the curd from the curd container 141.

The milk stored in the curd container 141 is heated by heater 150 and thus fermented into curd. The curd is cooled by the fan 160. Consequently, the curd is prevented from being over-fermented and thus stored in a refrigerated state.

The curd door 145 opens and closes the second opening 121 of the inner case 120 in a sliding fashion. Since the curd container 141 is detachably mounted in the curd container mounting part 149 coupled to the curd door 145, the curd container 141 is inserted into and withdrawn from the inner case 120 according to opening and closing of the curd door 145.

Figure 7:
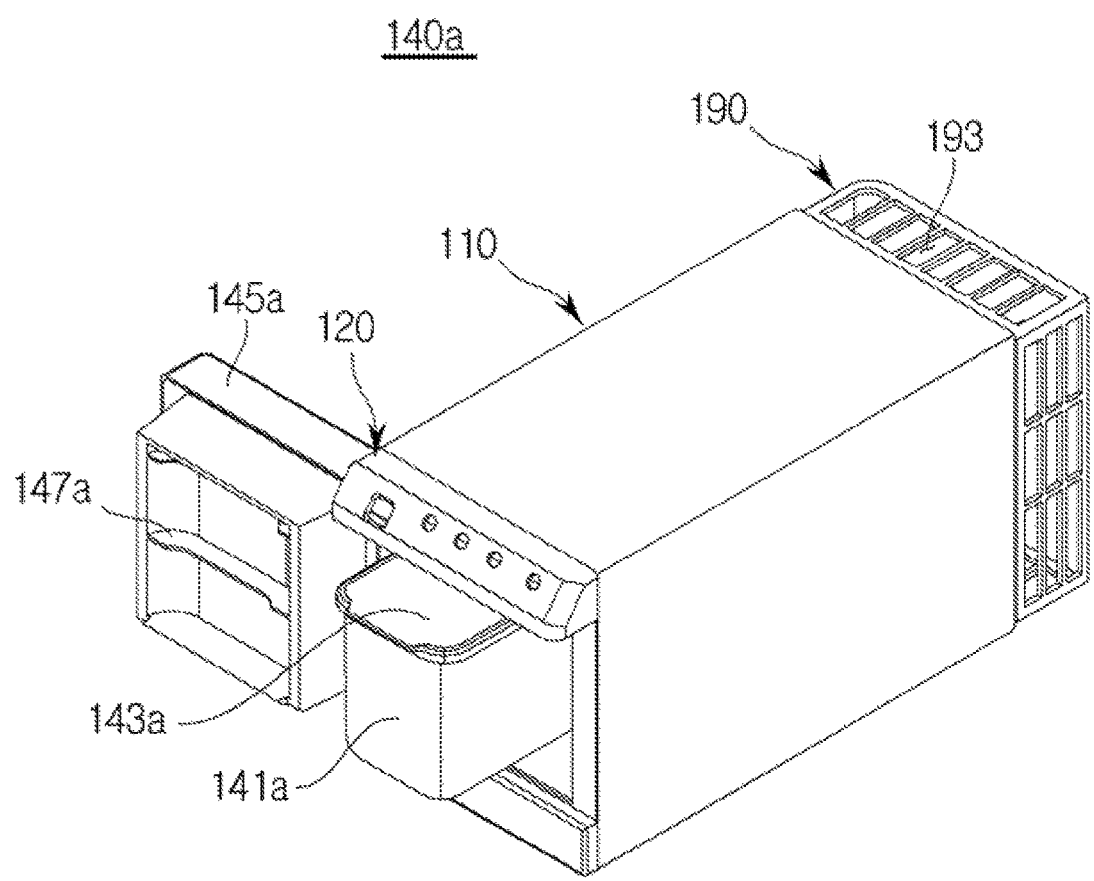
FIG. 7 is a view showing an embodiment of FIG. 6.

As shown in FIG. 7, a curd container assembly 140a may be configured such that a curd door 145a is hinged to the inner case 120 to open and close the second opening 121.

In a structure in which the curd door 145a is hinged to the inner case 120, configurations of a curd container 141a, a cover 143a, and a division rib 147a are identical to a case in which the curd door 145 opens and closes the second opening in a sliding fashion as shown in FIGS. 5 to 7 except that the curd container 141 a is inserted into the inner case 120 in a state in which the curd container 141a is separated from the curd door 145a.

Since the curd container 141a is separated from the curd door 145a, a user opens the curd door 145a, inserts or withdraws the curd container 141a, and closes the curd door 145a.

Figure 8:
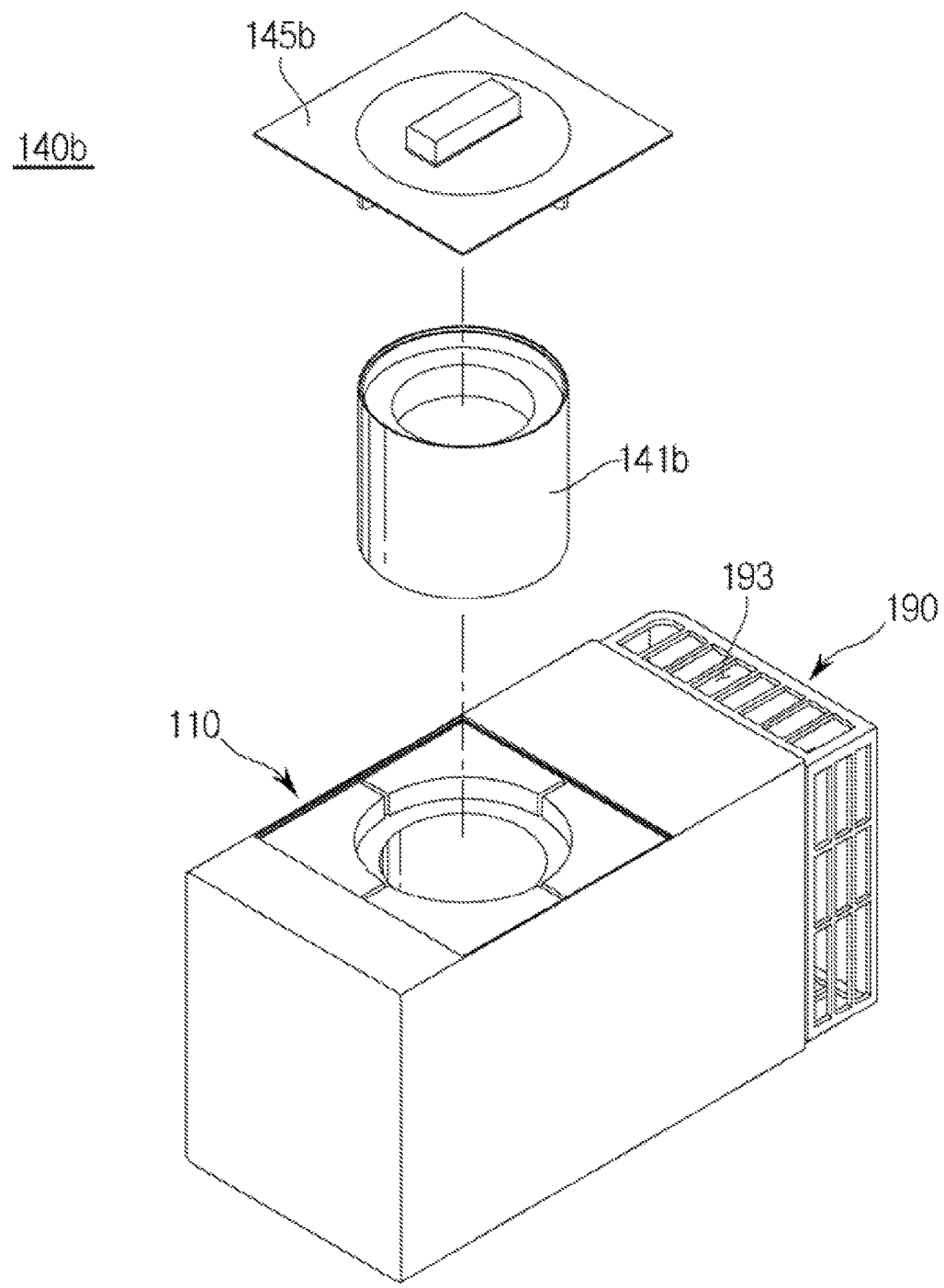
FIG. 8 is a view showing an embodiment of FIG. 6.
Figure 9:
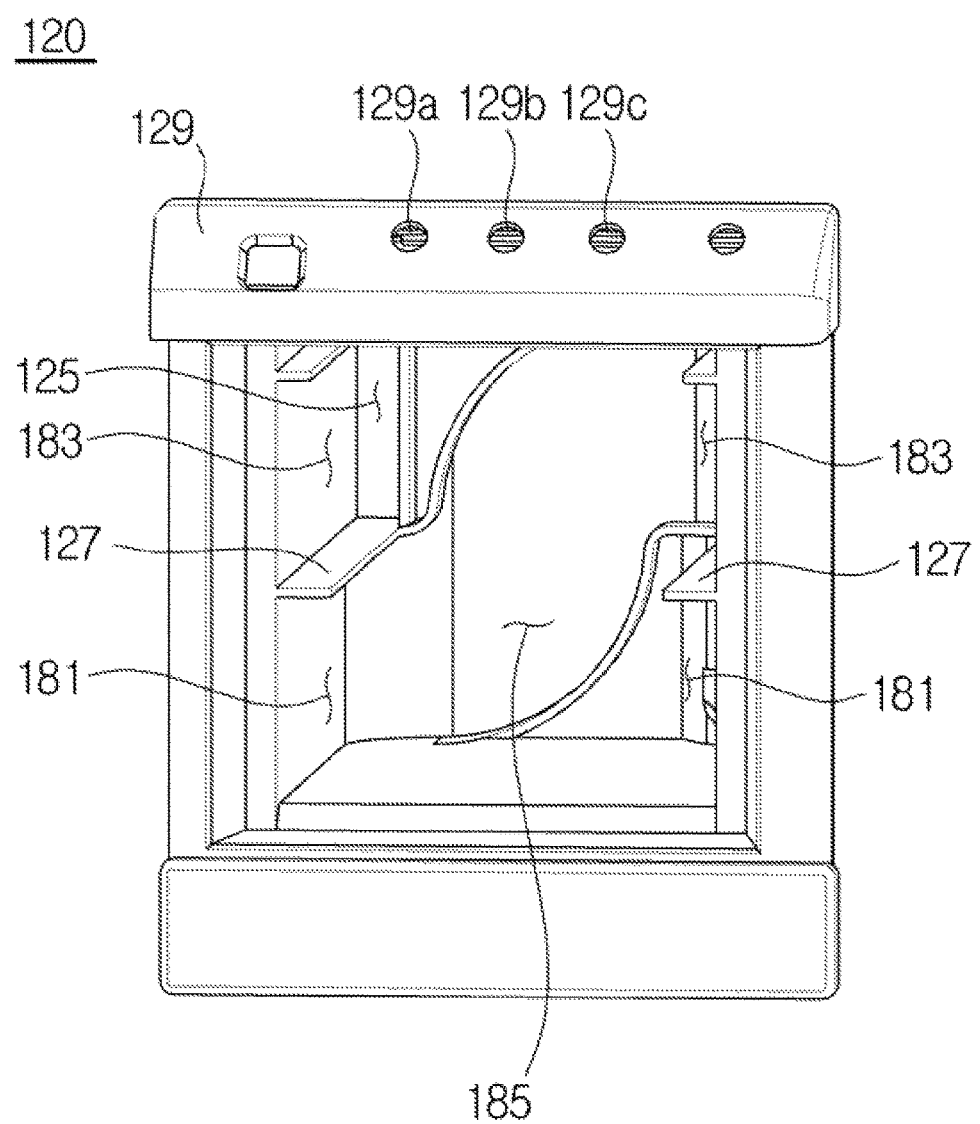
FIGS. 9 and 10 are views showing a state in which a flow channel is formed in an inner case according to an embodiment.
Figure 10:
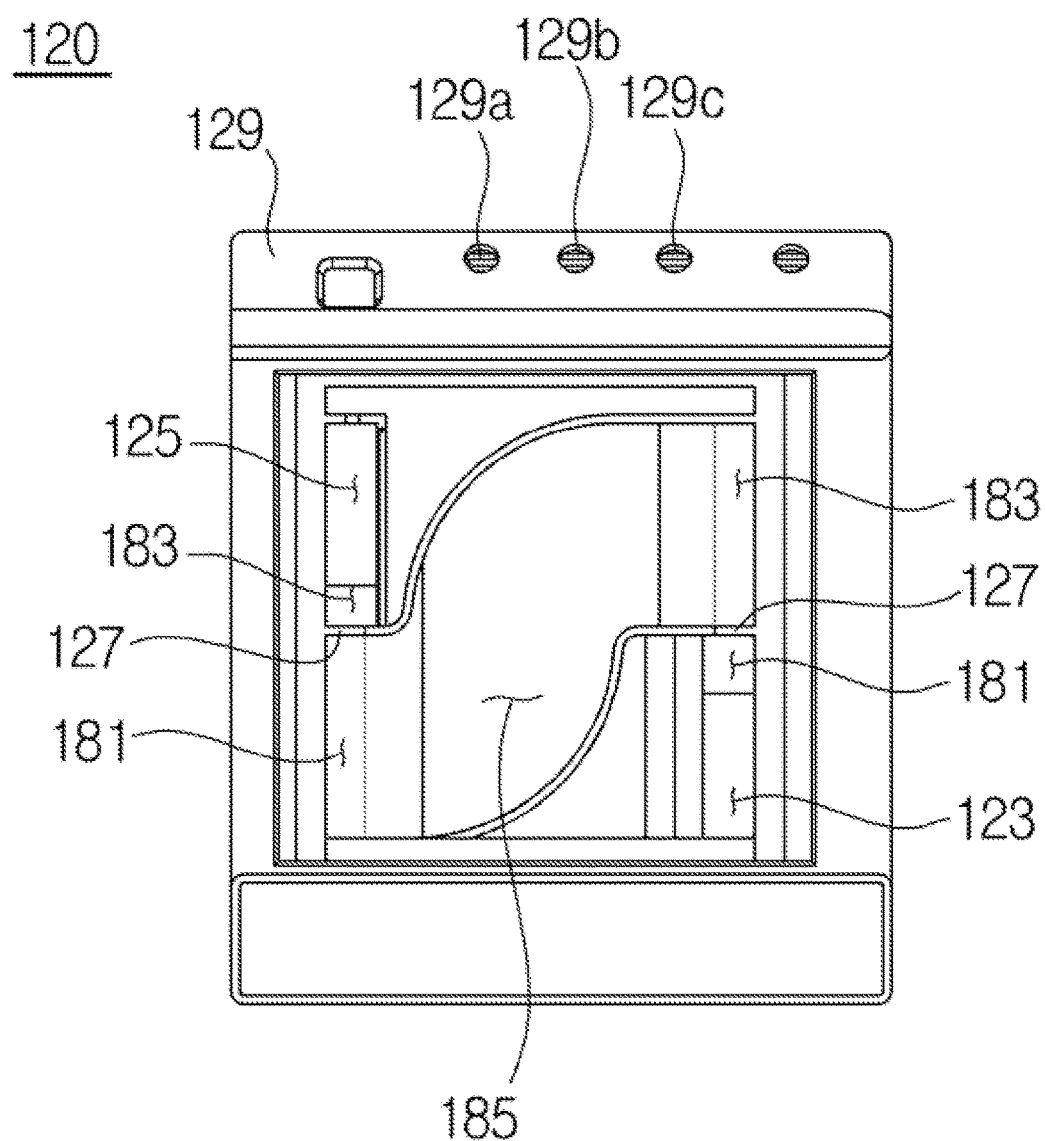
Figure 11:
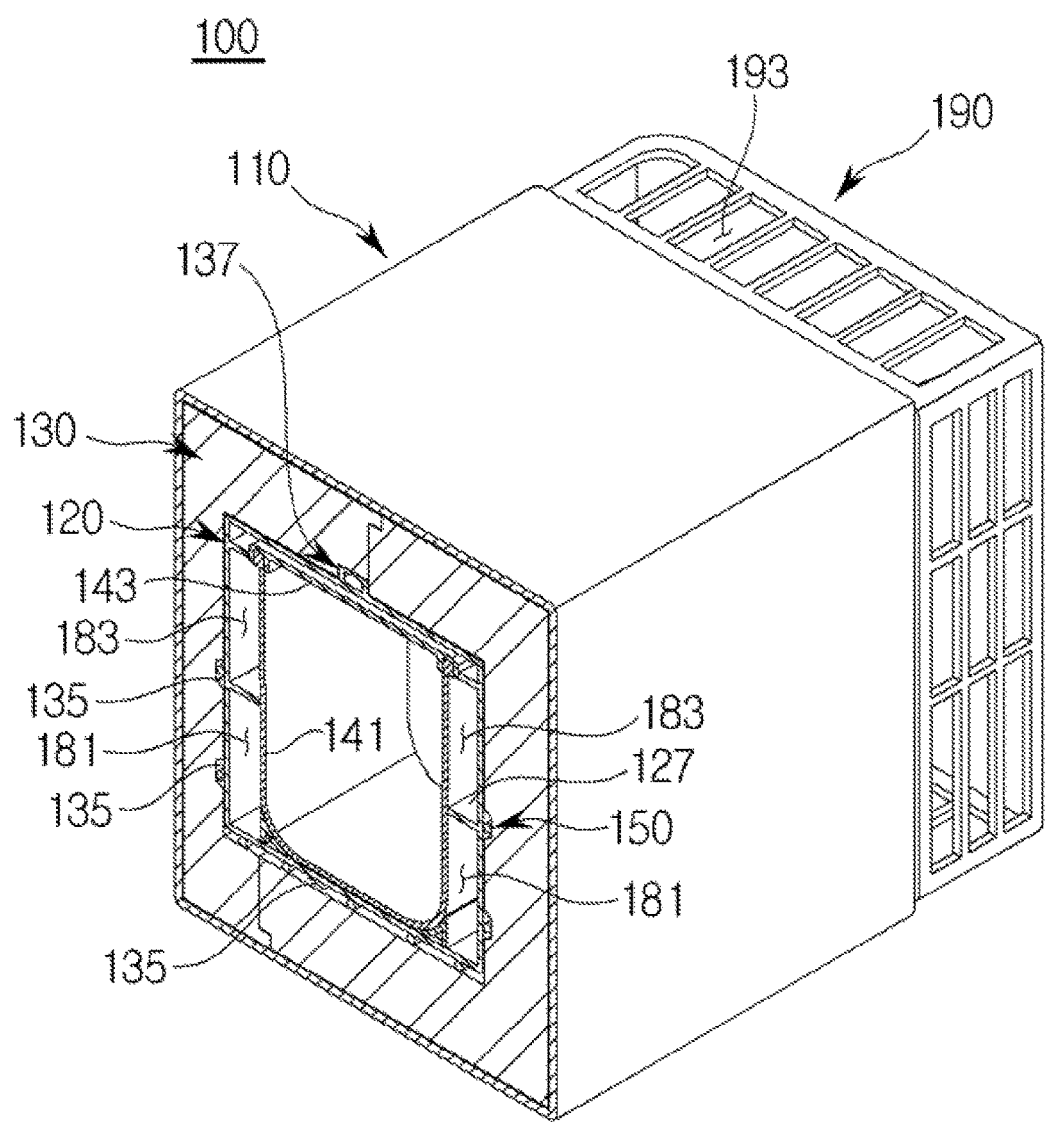
FIG. 11 is a partially cutaway view of the curd maker according to an embodiment.

As shown in FIG. 8, a portion of the top of the curd maker 100 may be open and a curd container assembly 140b may be configured such that the open top of the curd maker 100 is opened and closed by a curd door 145b to insert and withdraw a curd container 141b.

As shown in FIGS. 4 and 11 to 13, the heater 150 is installed in the heater installation part 135 provided at the insulation member 130 such that the heater installation part 135 is disposed at the left and right sides and bottom of the inner case 120.

The heater 150 installed in the heater installation part 135 is located between the inner case 120 and the insulation member 130 to heat the curd container 141 such that milk in the curd container 141 is fermented into curd.

As shown in FIGS. 3 and 4, the fan 160 is mounted in the first suction port 113 of the outer case 110 to suction cool air from the refrigerating compartment 21 and to supply the suctioned cool air to the curd container 141.

The cool air supplied by the fan 160 is supplied to the curd container 141 through the flow channel 180, which will be described hereinafter.

When the milk is fermented into curd by the heater 150, cool air is supplied to the curd container 141 by the fan 160 to prevent the curd from being over-fermented and, therefore, the curd is kept fresh.

Figure 12:
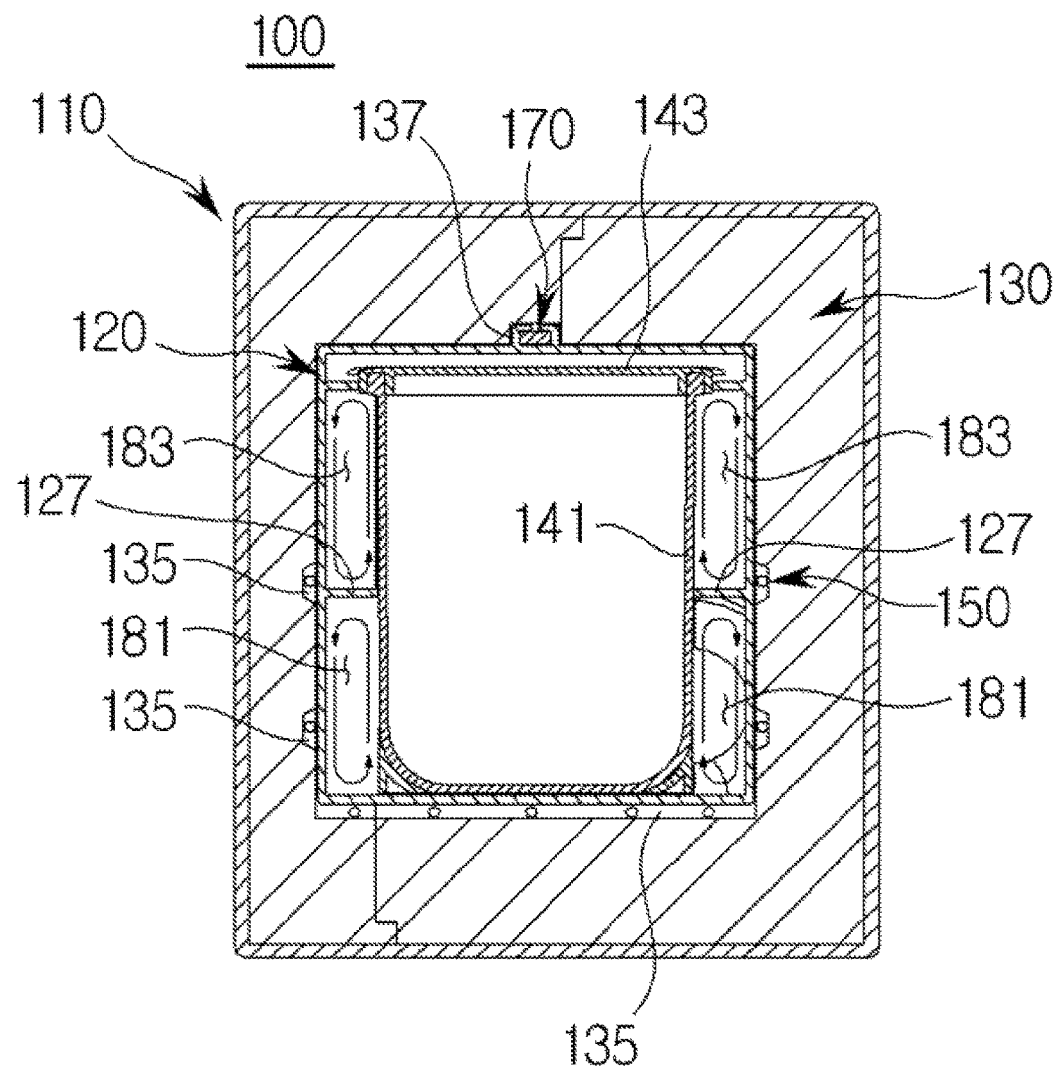
FIG. 12 is a sectional view of the curd maker according to an embodiment.
Figure 13:
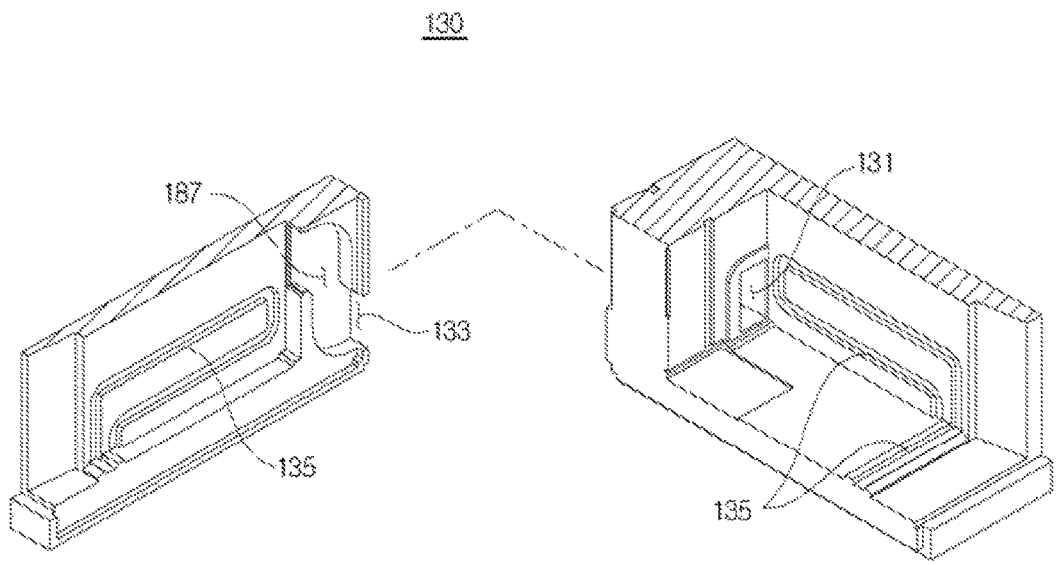
FIG. 13 is a view showing an insulation member according to an embodiment.
Figure 14:
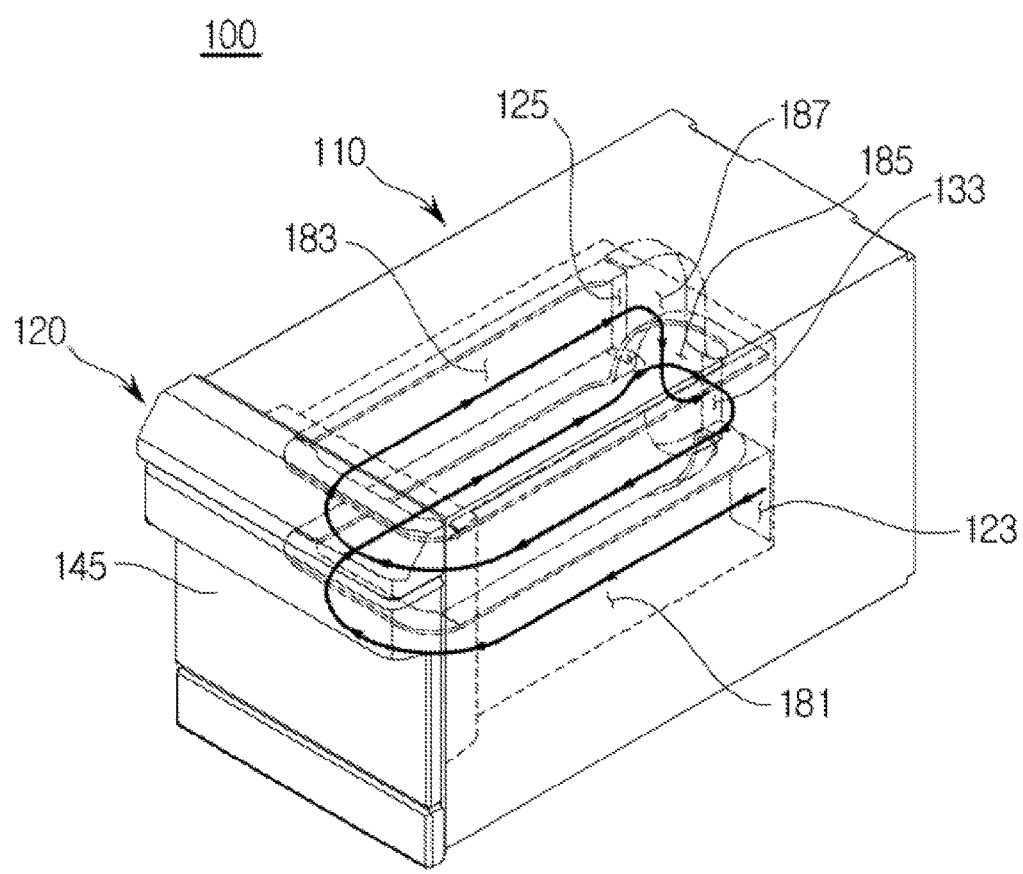
FIG. 14 is a view showing cool air circulating in a flow channel according to an embodiment.

As shown in FIGS. 4 and 12, the temperature sensor 170 is installed in the temperature sensor installation part 137 provided at the insulation member 130 such that the temperature sensor installation part 137 is disposed at the top of the inner case 120.

The temperature sensor 170 installed in the temperature sensor installation part 137 is located between the inner case 120 and the insulation member 130 to measure temperature in the curd maker 100. Consequently, the controller 129 controls the heater 150 when milk in the curd container 141 is fermented by the heater 150 and the controller 129 controls the fan 160 when cool air is supplied to the curd container 141 by the fan 160.

As shown in FIGS. 3, 4, and 9 to 14, cool air supplied from the refrigerating compartment 21 into the curd maker 100 by the fan 160 circulates along the flow channel 180 to uniformly cool the curd container 141.

The flow channel 180 is provided between the inner case 120 and the curd container 141 such that the flow channel 180 surrounds the curd container 141.

The flow channel 180 includes a first flow channel 181, communicating with the third suction port 123 of the inner case 120, surrounding the lower left and right sides and front of the curd container 141, a second flow channel 183, located above the first flow channel 181, surrounding the upper left and right sides and front of the curd container 141, a third flow channel 185, via which the first flow channel 181 and the second flow channel 183 communicate with each other, and a fourth flow channel 187 to guide cool air sequentially circulating along the first flow channel 181, the third flow channel 185, and the second flow channel 183 to the outside.

The first flow channel 181 and the second flow channel 183 surround the left and right sides and front of the curd container 141. The first flow channel 181 and the second flow channel 183 are vertically isolated from each other by the division ribs 127 provided at the left and right sides of the inner case 120 and the division rib 147 provided at the rear of the curd door 145.

Since the first flow channel 181 communicates with the third suction port 123 of the inner case 120, cool air suctioned by the fan 160 sequentially passes through the first suction port 113, the second suction port 131, and the third suction port 123 and then circulates along the first flow channel 181.

The cool air having cooled the lower part of the curd container 141 along the first flow channel 181 is guided to the second flow channel 183 via the third flow channel 185, via which the first flow channel 181 and the second flow channel 183 communicate with each other.

The third flow channel 185, via which the first flow channel 181 and the second flow channel 183 communicate with each other, is provided at the rear of the inner case 120.

Since the third flow channel 185 is provided at the rear of the inner case 120, cool air suctioned through the third suction port 123 provided at the rear of the inner case 120 and circulating along the first flow channel 181 circulates around the lower left and right sides and front of the curd container 141, circulates around the rear of the curd container 141 along the third flow channel 185, is guided to the second flow channel 183, and circulates around the upper left and right sides and front of the curd container 141.

Since cool air suctioned from the refrigerating compartment 21 by the fan sequentially circulates along the first flow channel 181, the third flow channel 185, and the second flow channel 183, the cool air is uniformly transferred to the left and right sides, front, and rear of the curd container 141.

The cool air having sequentially circulated along the first flow channel 181, the third flow channel 185, and the second flow channel 183 is discharged through the first discharge port 125 provided at the rear of the inner case 120 to communicate with the second flow channel 183.

The fourth flow channel 187 is provided at the insulation member 130 such that one end of the fourth flow channel 187 communicates with the first discharge port 125 and the other end of the fourth flow channel 187 communicates with the second discharge port 133 of the insulation member 130.

Consequently, the cool air having circulated around the curd container 141 is guided to the second discharge port 133 via the fourth flow channel 187. Since the second discharge port 133 positionally corresponds to the third discharge port 115 of the outer case 110, the cool air sequentially passes through the second discharge port 133 and the third discharge port 115 and is discharged into the refrigerating compartment 21 through the air vents 193 of the partition 190.

Since the blocking wall 191 to isolate the third discharge port 115 and the first suction port 113 provided at the rear of the outer case 110 is provided at the partition 190, the cool air discharged through the third discharge port 115 is discharged into the refrigerating compartment 21 without being mixed with cool air suctioned through the first suction port 113.

A process in which curd is made by the curd maker 100 is as follows. First, as shown in FIG. 6, the curd door 145 is opened to withdraw the curd container 141. When milk is poured into the curd container 141 and the curd door 145 is closed, the curd container 141 is inserted into the curd maker 100.

When the curd container 141 is filled with the milk, the heater 150 is operated to heat the curd container 141 under control of the controller 129.

As shown in FIG. 12, the first flow channel 181 and the second flow channel 183 are provided at the upper and lower left and right sides of the curd container 141, respectively. When the curd container 141 is heated by the heater 150, therefore, the upper and lower parts of the curd container 141 are uniformly heated with the result that a temperature difference between the upper and lower parts of the curd container 141 is decreased.

During fermentation of the milk, the controller 129 controls the heater 150 based on temperature measured by the temperature sensor 170 such that the interior of the curd maker 100 is maintained at an appropriate temperature.

When the milk in the curd container 141 is fermented into curd, the operation of the heater 150 is stopped and the fan 160 is operated under control of the controller 129.

When the fan 160 is operated, as shown in FIGS. 9 to 14, cool air suctioned from the refrigerating compartment 21 through the air vents 193 of the partition 190 is transferred to the first flow channel 181 communicating with the third suction port 123 via the first suction port 113 of the outer case 110, the second suction port 131 of the insulation member 130, and the third suction port 123 of the inner case 120.

The cool air transferred to the first flow channel 181 circulates along the first flow channel 181 to cool the lower left and right sides and front of the curd container 141.

The cool air having circulated along the first flow channel 181 circulates along the third flow channel 185 to cool the rear of the curd container 141 and is transferred to the second flow channel 183.

The cool air transferred to the second flow channel 183 circulates along the second flow channel 183 to cool the upper left and right sides and front of the curd container 141.

The cool air having circulated along the second flow channel 183 is discharged through the first discharge port 125 provided at the rear of the inner case 120 and is guided to the fourth flow channel 187 communicating with the first discharge port 125. The cool air guided to the fourth flow channel 187 is discharged into the refrigerating compartment 21 through the air vents 193 of the partition 190 via the second discharge port 133 of the insulation member 130 and the third discharge port 115 of the outer case 110.

The cool air discharged through the third discharge port 115 is not mixed with cool air suctioned through the first suction port 113 by the blocking wall 191 of the partition 190. Consequently, recirculation of the cool air is prevented, thereby efficiently cooling the curd container 141.

When the cool air is suctioned from the refrigerating compartment 21 by the fan 160 to cool the curd container 141, the controller 129 controls the fan 160 based on temperature measured by the temperature sensor 170 such that the interior of the curd maker 100 is maintained at an appropriate temperature.

Hereinafter, operation of the curd maker 100 controlled by the controller 129 will be described in detail.

As shown in FIG. 4, the controller 129 may include a fermentation button 129a, a cooling button 129b, and a storage button 129c.

The fermentation button 129a is used to heat the curd container 141 such that the milk stored in the curd container 141 is fermented.

When the fermentation button 129a is operated, the heater 150 is turned on to heat the curd container 141 containing the milk.

At this time, the heater 150 is controlled to be repeatedly turned on/off based on the temperature measured by the temperature sensor 170 such that the curd container 141 is heated to a temperature of 30 degrees or more for less than 6 hours. For example, the curd container 141 may be heated to a temperature of about 37 degrees for less than 6hours.

When the curd container 141 is heated, the milk in the curd container 141 is fermented into curd. When the curd is made, switching to a cooling mode is automatically performed without operation of the cooling button 129b to turn the heater 150 off such that the curd is no longer fermented.

The fan 160 is turned on to perform switching to the cooling mode simultaneously when the heater 150 is turned off. Consequently, cool air is transferred from the refrigerating compartment 21 to the curd container 141.

At this time, the fan 160 is controlled such that the curd container 141 is cooled to a temperature of minus 5 degrees or less for less than 6 hours. When the temperature of the curd container 141 measured by the temperature sensor 170 is minus 5 degrees or less, switching to a storage mode is automatically performed without operation of the storage button 129c to turn the fan 160 off such that the curd container 141 is no longer cooled.

After the fan 160 is turned off, the fan 160 is repeatedly turned on/off to uniformly maintain the temperature of the curd container 141 measured by the temperature sensor 170 such that the curd is stored in a refrigerated state.

Although not shown, the fermentation button 129a may be configured to adjust a fermentation degree divided into high, middle, and low fermentation levels to adjust taste of the curd.

The cooling button 129b is used to cool the curd such that the curd is no longer fermented.

When the fermentation button 129a is operated, switching to the cooling mode and the storage mode is automatically performed. Consequently, it may not be necessary to operate the cooling button 129b. When the curd is withdrawn from the refrigerating compartment 21 and is then inserted into the curd maker 100, however, the cooling button 129b may be operated to perform switching to the cooling mode such that the curd container 141 is cooled to a temperature of minus 5 degrees or less.

When the cooling button 129b is operated, the fan 160 is turned on to transfer cool air from the refrigerating compartment 21 to the curd container 141 such that the curd in the curd container 141 is cooled.

At this time, the fan 160 is controlled such that the curd container 141 is cooled to a temperature of minus 5 degrees or less for less than 6 hours. When the temperature of the curd container 141 measured by the temperature sensor 170 is minus 5 degrees or less, switching to the storage mode is automatically performed without operation of the storage button 129c to turn the fan 160 off such that the curd container 141 is no longer cooled.

After the fan 160 is turned off, the fan 160 is repeatedly turned on/off to uniformly maintain the temperature of the curd container 141 measured by the temperature sensor 170 such that the curd is stored in a refrigerated state.

When the storage button 129c is operated, the fan 160 is repeatedly turned on/off to uniformly maintain the temperature of the curd container 141 measured by the temperature sensor 170 such that the curd is stored in a refrigerated state.

In an example in which operation of the curd maker 100 stops due to a power failure, the controller 129 may control the curd maker 100 such that the curd maker 100 returns to the mode before the operation of the curd maker 100 stops when the refrigerator is powered on again.

As is apparent from the above description, according to embodiments, curd may be conveniently made and kept fresh. In addition, heating and cooling efficiencies may be improved. Consequently, taste and quality of the curd may be improved and uniformly maintained.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
    a main body;
    a refrigerating compartment provided in the main body such that a front of the refrigerating compartment is open; and
    a curd maker provided in the refrigerating compartment to ferment milk into curd, wherein the curd maker comprises:
    a case comprising an outer case forming an external appearance of the case and an inner case provided in the outer case;
    an insulation member provided between the outer case and the inner case;
    a curd container received in the inner case to store milk;
    a heater provided between the inner case and the insulation member to heat the curd container;
    a fan to supply cool air from the refrigerating compartment to the curd container to cool the curd container; and
    a temperature sensor to measure temperature in the curd maker.

2. The refrigerator according to claim 1, wherein the case has a front with openings, through which the curd container is inserted and withdrawn, and the openings comprise a first opening provided at a front of the outer case and a second opening provided at a front of the inner case.

3. The refrigerator according to claim 2, wherein the second opening is opened and closed by a curd door and the curd container is detachably mounted at a rear of the curd door.

4. The refrigerator according to claim 3, wherein the curd door is moved forward and backward in a sliding fashion such that the curd container is inserted into and withdrawn from the curd maker.

5. The refrigerator according to claim 4, wherein the curd container is open at a top of the curd container and a cover is provided at the open top of the curd container to seal an interior of the curd container.

6. The refrigerator according to claim 2, wherein the second opening is opened and closed by a curd door hinged to the inner case such that the curd container is inserted and withdrawn from the case and wherein the curd container is open at a top thereof and a cover is provided at the open top of the curd container to seal an interior of the curd container.

7. The refrigerator according to claim 1, wherein the outer case is provided at a lower end of a rear of the outer case with a first suction port, in which the fan is mounted and through which cool air from the refrigerating compartment is suctioned by the fan, and the insulation member and the inner case are respectively provided with a second suction port and a third suction port corresponding in position to the first suction port such that the cool air suctioned by the fan is transferred to the curd container.

8. The refrigerator according to claim 7, wherein the curd container is provided at a front, rear, and left and right sides of the curd container with a flow channel communicating with the third suction port while surrounding the curd container such that the cool air suctioned by the fan is transferred to the curd container.

9. The refrigerator according to claim 8, wherein the flow channel comprises a first flow channel, communicating with the third suction port, surrounding lower part of the left and right sides and the front of the curd container, a second flow channel, divided from the first flow channel, surrounding upper part of the left and right sides and the front of the curd container, a third flow channel, via which the first flow channel and the second flow channel communicate with each other such that cool air having passed through the first flow channel is guided to the second flow channel, and a fourth flow channel communicating with the second flow channel to guide the cool air such that the cool air is discharged outside.

10. The refrigerator according to claim 9, wherein the first flow channel and the second flow channel are divided from each other by division ribs provided at the left and right sides of the inner case and a rear of the curd door such that the first flow channel and the second flow channel are respectively located at the upper part and the lower part of the curd container to uniformly circulate the cool air along the upper part and the lower part of the curd container.

11. The refrigerator according to claim 10, wherein the third flow channel is provided at a rear of the inner case and the first flow channel and the second flow channel communicate with each other via the third flow channel such that the cool air having circulated along the first flow channel is guided to the second flow channel and circulates along the second flow channel.

12. The refrigerator according to claim 11, wherein the inner case is provided at the rear thereof with a first discharge port communicating with the second flow channel such that the cool air having circulated along the second flow channel is discharged from the inner case.

13. The refrigerator according to claim 12, wherein the insulation member is provided at a lower end of a rear thereof with a second discharge port, through which the cool air discharged through the first discharge port is discharged outside.

14. The refrigerator according to claim 13, wherein the insulation member is provided with the fourth flow channel, via which the first discharge port and the second discharge port communicate with each other such that the cool air discharged through the first discharge port is discharged outside through the second discharge port.

15. The refrigerator according to claim 14, wherein the outer case is provided with a third discharge port corresponding in position to the second discharge port such that the cool air discharged through the second discharge port is discharged outside.

16. The refrigerator according to claim 15, wherein, when the curd container is heated by the heater to make curd, cool air suctioned by the fan circulates along the flow channel to uniformly cool the curd container such that the curd is prevented from being fermented and kept fresh.

17. The refrigerator according to claim 16, wherein the insulation member is provided at left and right sides and a bottom thereof with a heater installation part, in which the heater is installed.

18. The refrigerator according to claim 17, wherein the heater heats the curd container at the left and right sides and a bottom of the curd container and the first flow channel and the second flow channel are provided at the left and right sides of the curd container such that the upper and lower parts of the curd container are heated in a divided state and thus the curd container is uniformly heated.

19. The refrigerator according to claim 15, wherein a partition, by which the curd maker is spaced apart from an inner liner defining the refrigerating compartment, is coupled to the rear of the outer case.

20. The refrigerator according to claim 19, wherein the partition comprises a blocking wall provided between the third discharge port and the first suction port to prevent the cool air discharged through the third discharge port from being re-suctioned through the first suction port.

21. The refrigerator according to claim 20, wherein the partition is provided with a plurality of air vents, through which cool air from the refrigerating compartment is suctioned through the first suction port or the cool air suctioned through the first suction port circulates along the flow channel, is discharged through the third discharge port, and is transferred to the refrigerating compartment.

22. The refrigerator according to claim 1, wherein the insulation member is provided at an inner top thereof with a temperature sensor installation part, in which the temperature sensor is installed, and, based on the temperature in the curd maker measured by the temperature sensor, the heater is controlled when the curd container is heated by the heater and the fan is controlled when the curd container is cooled by the fan to control heating and cooling of the curd container.

23. A refrigerator comprising a curd maker provided in a refrigerating compartment to ferment milk into curd, wherein the curd maker comprises:
  a case comprising an outer case forming an external appearance of the case and an inner case provided in the outer case;
  an insulation member provided between the outer case and the inner case;
  a curd container received in the inner case to store milk;
  a heater provided at left and right sides and a bottom of the inner case to heat the curd container;
  a fan provided at a lower end of a rear of the outer case to supply cool air from the refrigerating compartment to the curd container; and
  a flow channel surrounding a front, rear, and left and right sides of the curd container such that the cool air supplied by the fan is transferred to the curd container, and wherein
  the flow channel comprises a first flow channel and a second flow channel respectively provided at an upper part and a lower part of the left and right sides of the curd container in a divided state, the first flow channel and the second flow channel communicating with each other such that the cool air is uniformly transferred to the curd container.

24. The refrigerator according to claim 23, wherein the case has a front with openings, through which the curd container is inserted and withdrawn from the case, and the openings comprise a first opening provided at a front of the outer case and a second opening provided at a front of the inner case.

25. The refrigerator according to claim 24, wherein the second opening is opened and closed by a curd door moving forward and backward in a sliding fashion and the curd container is detachably mounted at a rear of the curd door such that the curd container is moved forward and backward in a sliding fashion together with the curd door and thus the curd container is inserted into and withdrawn from the curd maker.

26. The refrigerator according to claim 25, wherein the curd container is open at a top of the curd container and a cover is provided at the open top of the curd container to seal an interior of the curd container.

27. The refrigerator according to claim 23, wherein the outer case is provided at a lower end of a rear of the outer case with a first suction port, in which the fan is mounted and through which cool air from the refrigerating compartment is suctioned by the fan, and the insulation member and the inner case are respectively provided with a second suction port and a third suction port corresponding in position to the first suction port such that the cool air suctioned by the fan is transferred to the curd container.

28. The refrigerator according to claim 27, wherein the flow channel communicates with the third suction port such that the cool air suctioned by the fan is transferred to the curd container.

29. The refrigerator according to claim 28, wherein the flow channel comprises a first flow channel, communicating with the third suction port, surrounding lower part of the left and right sides and the front of the curd container, a second flow channel, divided from the first flow channel, surrounding upper part of the left and right sides and the front of the curd container, a third flow channel, via which the first flow channel and the second flow channel communicate with each other such that cool air having passed through the first flow channel is guided to the second flow channel, and a fourth flow channel communicating with the second flow channel to guide the cool air such that the cool air is discharged outside.

30. The refrigerator according to claim 29, wherein the first flow channel and the second flow channel are divided from each other by division ribs provided at the left and right sides of the inner case and a rear of the curd door such that the first flow channel and the second flow channel are respectively located at the upper part and the lower part of the curd container to uniformly circulate the cool air along the upper part and the lower part of the curd container.

31. The refrigerator according to claim 30, wherein the third flow channel is provided at a rear of the inner case and the first flow channel and the second flow channel communicate with each other via the third flow channel such that the cool air having circulated along the first flow channel is guided to the second flow channel and circulates along the second flow channel.

32. The refrigerator according to claim 31, wherein the inner case is provided at the rear of the inner case with a first discharge port communicating with the second flow channel such that the cool air having circulated along the second flow channel is discharged from the inner case.

33. The refrigerator according to claim 32, wherein the insulation member is provided at a lower end of a rear of the case between the inner case and the outer case with a second discharge port, through which the cool air discharged through the first discharge port is discharged outside.

34. The refrigerator according to claim 33, wherein the insulation member is provided with the fourth flow channel, via which the first discharge port and the second discharge port communicate with each other such that the cool air discharged through the first discharge port is discharged outside through the second discharge port.

35. The refrigerator according to claim 34, wherein the outer case is provided with a third discharge port corresponding in position to the second discharge port such that the cool air discharged through the second discharge port is discharged outside.

36. The refrigerator according to claim 35, wherein, when the curd container is heated by the heater to make curd, cool air suctioned by the fan circulates along the flow channel to uniformly cool the curd container such that the curd is prevented from being fermented and kept fresh.

37. The refrigerator according to claim 36, wherein the heater is installed at a heater installation part provided at left and right sides and a bottom of the insulation member to heat the curd container and the first flow channel and the second flow channel are provided at the left and right sides of the curd container heated by the heater such that the upper and lower parts of the curd container are heated in a divided state and thus the curd container is uniformly heated.

38. The refrigerator according to claim 35, wherein a partition, by which the curd maker is spaced apart from an inner liner defining the refrigerating compartment, is coupled to the rear of the outer case and the partition comprises a blocking wall provided between the third discharge port and the first suction port to prevent the cool air discharged through the third discharge port from being re-suctioned through the first suction port.

39. The refrigerator according to claim 38, wherein the partition is provided with a plurality of air vents, through which cool air from the refrigerating compartment is suctioned through the first suction port or the cool air suctioned through the first suction port circulates along the flow channel, is discharged through the third discharge port, and is transferred to the refrigerating compartment.

40. The refrigerator according to claim 23, wherein the insulation member is provided at an inner top of the case between the inner case and the outer case with a temperature sensor installation part, in which a temperature sensor to measure temperature in the curd maker is installed, and, based on the temperature in the curd maker measured by the temperature sensor, the heater is controlled when the curd container is heated by the heater and the fan is controlled when the curd container is cooled by the fan to control heating and cooling of the curd container.

41. A curd maker provided in a refrigerating compartment to make and store curd through heating and cooling, the curd maker comprising:
a case comprising an outer case forming an external appearance of the case and an inner case provided in the outer case;
an insulation member provided between the outer case and the inner case;
a curd container received in the inner case to store milk;
a heater provided at left and right sides and a bottom of the inner case to heat the curd container;
a fan provided at a lower end of a rear of the outer case to supply cool air from the refrigerating compartment to the curd container;
a temperature sensor provided at a top of the inner case to measure temperature; and
a flow channel surrounding a front, rear, and left and right sides of the curd container such that the cool air supplied by the fan is transferred to the curd container, wherein the flow channel comprises:
a first flow channel, along which cool air suctioned by the fan circulates around lower parts of the left and right sides and the front of the curd container;
a second flow channel, divided from the first flow channel by division ribs provided at the left and right sides of the inner case and a rear of a curd door, along which the cool air having circulated along the first flow channel circulates around upper parts of the left and right sides and the front of the curd container;
a third flow channel, via which the first flow channel and the second flow channel communicate with each other; and
a fourth flow channel communicating with the second flow channel such that the cool air having circulated along the second flow channel is discharged outside.

42. A refrigerator comprising:
a main body;
a refrigerating compartment provided in the main body such that a front of the refrigerating compartment is open; and a curd maker provided in the refrigerating compartment to ferment milk into curd, wherein the curd maker comprises:

a curd container to store milk;

a heater to heat the curd container to ferment the milk;

a fan to supply cool air from the refrigerating compartment to the curd container to cool the curd container;

a temperature sensor to measure temperature in the curd maker; and a controller to control operation of the curd maker, and wherein the controller controls the heater to be turned on to heat the curd container, when fermentation of the milk is completed, the controller controls the heater to be turned off and simultaneously controls the fan to be turned on to cool the curd container, and, when cooling of the milk is completed, the controller controls the fan to be turned off and then controls the fan to be repeatedly turned fan on/off such that curd made by fermenting the milk is stored in a refrigerated state.

43. The refrigerator according to claim 42, wherein the controller comprises a fermentation button to heat the curd container such that the milk is fermented, a cooling button to cool the fermented milk, and a storage button to store the cooled milk in a refrigerated state.

44. The refrigerator according to claim 43, wherein, when the fermentation button is operated, the heater is turned on to heat the curd container, the heater is controlled to be repeatedly turned on/off such that the curd container is heated to a temperature of 30 degrees or more for less than 6 hours to ferment the milk, when the milk is fermented into curd, the heater is controlled to be turned off and simultaneously the fan is controlled to be turned on such that the curd container is cooled to a temperature of minus 5 degrees or less for less than 6 hours, and, when cooling is completed, the fan is controlled to be turned off and then to be repeatedly turned on/off such that the curd is stored in a refrigerated state.

45. The refrigerator according to claim 43, wherein, when the cooling button is operated, the fan is controlled to be turned on such that the curd container is cooled to a temperature of minus 5 degrees or less for less than 6 hours, and, when cooling is completed, the fan is controlled to be turned off and then to be repeatedly turned on/off such that the curd is stored in a refrigerated state.

46. The refrigerator according to claim 43, wherein, when the storage button is operated, the fan is controlled to be repeatedly turned on/off such that the curd is stored in a refrigerated state.

* * * * *